UNITED STATES PATENT OFFICE.

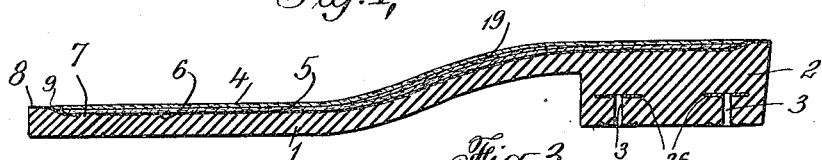
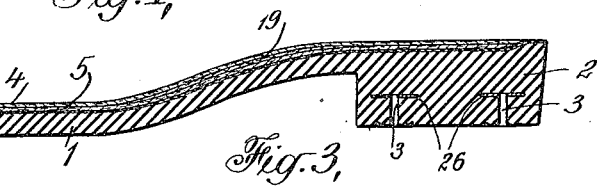
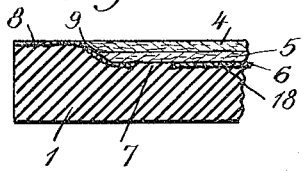
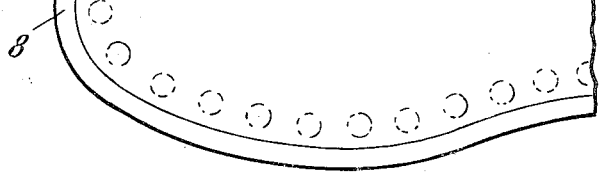
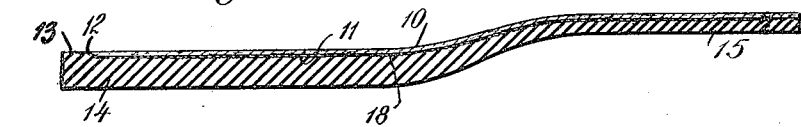
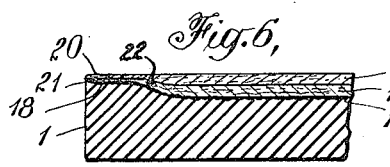
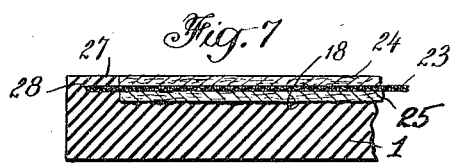

HENRY C. EGERTON, OF PASSAIC, NEW JERSEY.

STIFFENED RUBBER SHOE-SOLE.

1,282,397.        Specification of Letters Patent.     Patented Oct. 22, 1918.

Application filed May 17, 1918. Serial No. 235,078.

*To all whom it may concern:*

Be it known that I, HENRY C. EGERTON, a citizen of the United States, and resident of Passaic, county of Passaic, State of New Jersey, have made a certain new and useful Invention Relating to Stiffened Rubber Shoe-Soles, of which the following is a specification, taken in connection with the accompanying drawing, which forms part of the same.

This invention relates especially to stiffened rubber shoe soles, sometimes including the heel portions thereof, comprising stiffener strips or members extending throughout the desired part or the whole of the shoe sole or sole elements, and securely incorporated or united therewith in any suitable way, said stiffener members being formed of cloth, paper or other fabric preferably of a rather fibrous open texture which has been more or less impregnated or coated with phenol aldehyde cementing material such as bakelite varnish or the like and cured or solidified by heat so as to be in the stiff and strong moderately cured condition of such phenolic condensation cementing material. For some purposes it is desirable to have one of the canvas or other fabric strips or members provided with a layer or coating of rubber composition, such as a frictioned coating of rubber on one side while the other side or portion of the strip is coated or impregnated with or carries phenolic condensation cementing material, so that on curing the same in contact with additional stiffening strips or members of fabric carrying such phenolic condensation cementing material an integral stiffening element or member is formed. Also by applying to or incorporating with the coated side of such a fabric stiffener strip the rubber sole, with or without an integral heel, the heat treatment used to vulcanize or cure the rubber sole may simultaneously vulcanize it to the interposed fabric sole connector strip or member and also cure or solidify the phenolic condensation cementing material in the strip and in coöperating stiffener strips or elements forced in contact therewith in the curing or forming mold. It is usually desirable to have at the edge of the reinforced sole where the same is attached or secured to other portions of the shoe a relatively thin attaching portion or edge which preferably extends only around the front portion of the sole and which can be more readily pierced or penetrated by the stitching or other attaching elements and this may be provided in any of the forms of sole by either having a fewer number of stiffener strips or elements at this attaching edge portion or by using relatively less phenolic condensation cementing material therein, as for instance by first compressing these attaching edge portions of the stiffening strips to squeeze out or remove considerable of the cementing material before the parts are fully cured.

In the accompanying drawing showing in a somewhat diagrammatic way various illustrative embodiments of this invention, Figure 1 is a longtiudinal section through a shoe sole member.

Fig. 2 is a partial enlarged section thereof.
Fig. 3 is a partial bottom view of the same.
Fig. 4 is a longitudinal section through another form of shoe sole.

Fig. 5 is a similar view of still another embodiment of the invention; and Fig. 6 is an enlarged partial section thereof.

Fig. 7 is an enlarged partial section showing still another construction; and Fig. 8 is an enlarged transverse section showing still another arrangement.

As shown in Figs. 1 and 2 the sole connector stiffener element or member 6 may be of canvas or other woven fabric or any suitable sheet material of a sufficiently coherent permeable character which is preferably provided with a rubber coating or layer 18 on one side which in the case of a fabric connector may be a frictioned coating of suitable rubber composition. The other face of this sole connector may advantageously carry or have applied thereto a coating of phenolic condensation cementing material which in many cases may advantageously impregnate the body of the fabric sole connector so that the threads are more or less impregnated or permeated therewith. In most cases it is desirable to first apply the frictioned coating of rubber composition to the canvas or other fabric sole connector by the usual friction applying rolls and then the phenolic condensation cementing material, such, for instance, as bakelite varnish No. 1, may be forced into the other side of the fabric or otherwise applied thereto to the desired extent. One or more additional stiffener members of canvas or other suitable fabric or material may be used throughout the desired extent of the shoe sole, two of such additional stiffening strips 4, 5, being indicated which may be of eight ounce army duck, for instance, previously thoroughly impregnated with such phenolic condensation material and extending adjacent but not entirely to the edges of the shoe sole, the peripheral portions of these inner stiffener strips being, if desired, beveled or reduced as at 9 in Fig. 2. This leaves a reduced or single thickness thin attaching edge portion 8 which may extend around the shoe sole to the desired extent so as to facilitate the sewing or other attaching processes by which it is secured to the rest of the shoe, it being desirable to have such a relatively flexible and penetrable attaching edge around at least the front portion of the shoe sole where it is to be sewed to the welt member. If desired, of course, additional stiffening strips or members may be added to various parts of the shoe sole, and for instance, an extra layer of similarly impregnated fabric 19 may be incorporated at the shank portion of the shoe sole between the other stiffening layers and this shank stiffener may be of coated or impregnated paper, felt or cloth fabric in some cases.

When the stiffening fabric strips or elements have had the phenolic condensation cementing material superficially applied or otherwise incorporated therewith or applied thereto to the desired extent and when they have been assembled in the proper relative positions which can of course be conveniently done by applying them to one of the mold elements in which the shoe sole is to be molded and vulcanized they may be brought into contact with the shoe sole 1 of any suitable rubber composition with which, if desired, an integral heel 2 may be incorporated. These rubber portions may as the mold is brought together be thus strongly forced into contact with the rubber frictioned or coated surface 18 of the sole connector stiffener member so as to make intimate and thorough contact therewith. Then when the mold is heated by steam or in any other suitable way to the desired curing vulcanizing temperature of 300° Fahrenheit more or less, the rubber composition may be cured or vulcanized and simultaneously be strongly vulcanized to the sole connector member while at the same time if this vulcanizing process continues for a half hour or an hour or more as is usual in the vulcanizing of many shoe sole rubber compositions the phenolic condensation cementing material such as above referred to may thus be simultaneously cured or solidified into the so-called moderately cured solid condition and the entire shoe sole united into an integral structure in which the stiffening elements or strips stiffen and strengthen the connected rubber sole and minimize and prevent the undesirable flexibility of ordinary rubber sole compositions. In many cases the assembly of these stiffener members may be conveniently effected by preliminarily stitching or tacking them together before positioning them on the relatively flat surface of the mold element which engages the upper part of the completed shoe sole, and this mold element may be turned or supported so that this active molding surface is uppermost. These stiffener members may however be successively placed in position on the mold surface one on top of the other in proper relative position and be held in alinement as by positioning pins on the mold entering the strips which may adhere together even before being permanently united or connected into one composite stiffener, so that they thus retain their positions while being forced toward the other mold section or element in which may be originally placed the rubber sole composition of any suitable character and containing if desired rubber and other gummy or plastic materials and incorporated fibrous or inorganic fillers or weighting material. Of course, suitable nail securing washers 26 may be formed in the rubber heel by embedding them in the proper places in the rubber composition during the molding operation and also communicating nail holes 3 may be formed in the heel. In some cases also it is desirable to form interlocking or securing rubber plugs or members on the rubber sole to more securely unite it with the other parts of the shoe sole structure; and for this purpose a number of round or other holes or apertures 7 may be formed in the sole connector before the other pieces or strips are united thereto, and the rubber composition when it is forced against the connector strip by the closing of the mold is strongly forced into these holes so as to form therein connector plugs or members which may have the desired interlocking or dovetail action with one or more of the coöperating stiffener strips and more firmly unite the parts when the curing has taken place.

The use of one of more such fabric stiffener strips or elements containing cured phenolic condensation material permanently incorporated and united with a rubber sole is quite advantageous in many cases, since the rubber may be given in this way sufficient additional strength or stiffness so that when the wearer is walking over a stony or other uneven surface the shoe sole is not objectionably bent or indented, and if desired such stiffened rubber soles may be thus given fully as much strength and stiffness as if formed entirely of high grade sole leather without sacrificing the desirable tough and other serviceable characteristics of a relatively pure composition which are usually desirable on the wearing surface of the sole. Any desired number of coated or impregnated fabric strips or members may be used for such stiffening, strengthening purposes and heavy fabric of any suitable character, such, for instance, as canvas may be used and may advantageously be thoroughly impregnated so that when compressed and cured it may contain some thirty to sixty per cent. more or less of bakelite varnish or other suitable phenolic condensation cementing material. Good results in making such sole stiffening members in this way may be secured by thoroughly impregnating or filling heavy canvas with No. 1 bakelite varnish as by repeatedly immersing the canvas therein and running it through pressure rolls. Two plies of heavy cotton duck are usually sufficient for general purposes when something equivalent to eight ounce army duck is used for these two layers. They may be thoroughly and strongly united by first impregnating them with phenolic condensation cementing material of this character and then curing or uniting them by heat after they have been forced directly together so as to preferably give what is known as the intermediate curing or hardening of such phenolic cementing material, as is known as bakelite varnish. Good results can usually be secured by curing such material under pressure at temperatures of about 300° or so Fahrenheit for an hour or so, and when two such layers of duck are cured in this way they can be thoroughly united into a quite smooth, hard, strong sheet about $\frac{1}{16}$th of an inch thick which contains some fifty per cent. by weight of the cured phenolic condensation cementing material. The resistance of such a compound sheet stiffening element a sixteenth of an inch thick can be appreciated by considering that a relatively narrow strip can be bent from a straight form into a circle of two or three inches diameter without serious cracking or injury, and also that the bending modulus of rupture thereof corresponds to 15,000 to 18,000 pounds or so per square inch. Such cured stiffening elements formed of cloth, paper or other fibrous material carrying phenolic condensation cementing material are permanently stiff and strong and are practically independent of any ordinary heat changes to which footwear is properly subjected which is in marked contrast to the softening of pyroxylin or similar cementing material when moderately heated and its tendency to crack when chilled.

Another form of stiffened rubber shoe is shown in Fig. 4 as comprising a canvas or other fabric sole connector stiffener member 11 which may have a frictioned or other rubber coating 18 on its lower surface while its upper surface may have applied thereto or incorporated therewith any suitable phenolic condensation cementing material. The additional stiffening strip or element 10 may, if desired, be impregnated throughout with such phenolic condensation cementing material and may around the front and sides of the shoe sole extend adjacent but not entirely to the periphery of the sole connector so as to leave the thin attaching edge portion 13 of this connector projecting beyond the upper stiffener member and thus form a thinner or single layer attaching edge portion. The rubber composition sole 14 may be molded to the connector member so as to be united and incorporated with the rubber coating thereon and this sole may sometimes have a relatively thin or other heel portion 15 as desired. All the elements may be molded and cured under pressure at the desired heat of say, 300° or so for a sufficient time to properly vulcanize or cure the rubber sole and to cure or solidify the phenolic condensation cementing material in the sole connector and other stiffening elements so that all of these parts are strongly and permanently united into an integral shoe sole which may be stitched or otherwise attached to a shoe upper in originally making a shoe or in repairing operations.

In the form of the invention shown in Figs. 5 and 6 the sole connector stiffener strip or member 17 may, if desired, have its lower surface coated with any suitable rubber composition 18 which may in some cases be frictioned thereto either before or simultaneously with the application of the phenolic condensation cementing material to the other side of the strip or canvas member preferably so as to impregnate its fibers to a considerable extent at least. In case the sole connector does not have sufficient thickness and stiffness when cured an additional stiffening strip or layer 16 which may have phenolic condensation cementing material applied to or incorporated therewith may also be used and in some cases an additional layer of impregnated or other fabric 19 may be interposed or otherwise incorporated as an additional shank stiffener, as shown in Fig. 5. In some cases it is desirable to more or less unite and shape these fabric stiffener members before they are united to the rubber shoe sole and for this purpose they may be molded under pressure at sufficient heat to more or less cure them and solidify the incorporated phenolic condensation cementing material and if this is done at moderate temperatures of, say, 200° Fahrenheit or less for a number of hours these stiffening elements may, if desired, be completely cured or solidified without undesirably vulcanizing or altering the rubber layer or composition which may be present on the lower side of the sole connector 17. During the shaping and molding of such impregnated fabric stiffeners which if desired may be effected without the complete curing thereof it is in many cases desirable to squeeze out a considerable or the major part of the phenolic condensation cementing material from the attaching edge portions of the stiffener elements as by compressing the same considerably more forcibly than the other parts of the stiffening members. For instance, these impregnated fabric strips may be preliminarily compressed in a cool or moderately heated mold so that the attaching edge portions 20, 21 may sometimes as indicated in Figs. 5 and 6 be reduced to even less than half of the thickness of the rest of the strips, if desired, while the adjacent portions 22 may be of gradually increasing thickness as indicated. In this way when the material is finally cured these attaching edge portions are relatively soft and yielding and are much more readily stitched or nailed to the shoe welt or other parts than if they contained 40 or 50 per cent. of cured phenolic condensation cementing material. It is of course understood that similar results can be secured by applying in the first instance a relatively small proportion of such bakelite varnish or other suitable phenolic condensation material to these attaching edge portions of these stiffening elements and in such event all of the parts can be assembled and molded together with the rubber composition shoe sole in the vulcanizing molds. As indicated the shoe sole 1 of any suitable rubber composition may, if desired, have the heel portion 2 and may be forced in the vulcanizing mold against the rubber coated side 18 of the sole connector so that when subjected to the curing and vulcanizing heat the sole is vulcanized and simultaneously united to the sole connector and the phenolic condensation cementing material is simultaneously cured preferably to the moderately cured solidified condition so as to have the stiffness, strength, waterproof properties and also the smooth upper surface desired, which can, of course, be secured in any of these forms of shoe sole by giving the coöperating mold element a smooth or polished surface.

In the embodiment of the invention shown in Fig. 7 one or more fabric strips or stiffener members 24, 25 coated or impregnated with phenolic condensation cementing material may be used and if desired an interposed or uniting strip or member 23 of special open mesh or loosely woven fabric may be used in contact with or interposed between such stiffening strips. In some cases it is sufficient where such an open mesh strip is interposed between two previously impregnated stiffening elements to rely upon the phenolic condensation cementing material which may be squeezed into this connector strip during the molding and curing process without otherwise applying any such cementing material thereto. This uniting stiffener strip may, if desired, have an edge portion 28 extending into or through the adjacent attaching or edge portion 27 of the rubber sole 1 and this part of the strip may have the rubber securely incorporated with and attached thereto during the vulcanizing process in connection with a previously applied layer or coating of any suitable rubber composition which this part of the connector strip may contain. If desired a frictioned or other rubber coating 18 may be applied to the lower surface of the stiffening strip or element 25 with which the rubber sole engages. Fig. 8 shows still another arrangement in which a number of stiffening strips 29, 30, 31, may be used to reinforce the rubber sole 34 by reason of the application to or incorporation with these stiffening strips of suitable phenolic condensation cementing material. One of these stiffening strips, such as the upper strip 29 for instance, which may extend to the edge of the shoe sole, and also the exposed lower portion of the lower strip 31 may have a coating, such as 18, of any suitable rubber composition applied thereto to facilitate the strong and secure vulcanizing union therewith of the rubber sole composition during the molding thereof. If desired also additional reinforcing or sewing strips 33 which may be of open mesh or loosely woven fabric friction coated or otherwise coated or impregnated with rubber composition may be incorporated in the rubber sole preferably adjacent the lower surface thereof to give additional strength and security to the stitching which may be used to secure this integral stiffened rubber sole to the shoe.

This invention has been described in connection with a number of illustrative embodiments, forms, proportions, elements, parts, shapes, materials, compositions, methods of preparation, production and use, to the details of which disclosure the invention is not of course to be limited, since what is claimed as new and what is desired to be secured by Letters Patent is set forth in the appended claims.

I claim:

1. The integral stiffened rubber shoe sole comprising a sole connector stiffener member of canvas to one side of which a friction coating or rubber composition has been applied, phenolic condensation cementing material applied to the other side of said sole connector member and impregnating the fibers thereof, additional canvas stiffener members impregnated with phenolic condensation cementing material coöperating with the upper surface of said sole connector and extending adjacent the peripheral portions thereof to form a relatively thin penetrable attaching edge portion extending around the front portion of the shoe sole, the phenolic condensation cementing material in said stiffener members being cured to stiffen, waterproof and unite them, and a rubber composition sole and integral heel formed with incorporated nailing washers vulcanized to said sole connector member.

2. The integral stiffened rubber shoe sole comprising a sole connector stiffener member of canvas to one side of which a coating of rubber composition has been applied, phenolic condensation cementing material applied to the other side of said sole connector member and impregnating the fibers thereof, additional canvas stiffener members impregnated with phenolic condensation cementing material coöperating with said sole connector to form a relatively thin penetrable attaching edge portion extending around the front portion of the shoe sole, the phenolic condensation cementing material in said stiffener members being cured to stiffen, waterproof and unite them, and a rubber composition sole vulcanized to said sole connector member.

3. The integral stiffened rubber shoe sole comprising a fabric sole connector stiffener member, phenolic condensation cementing material applied to said sole connector member and impregnating the fibers thereof, an additional stiffener member carrying phenolic condensation cementing material coöperating with said sole connector and forming a relatively penetrable attaching edge portion extending around the front portion of the shoe sole, said phenolic condensation cementing material being cured to stiffen and unite said members, and a rubber composition sole vulcanized to said sole connector member.

4. The integral stiffened rubber shoe sole comprising a fabric sole connector stiffener member, phenolic condensation cementing material applied to said sole connector member and impregnating the fibers thereof, an additional stiffener member carrying phenolic condensation cementing material coöperating with said sole connector, said phenolic condensation cementing material being cured to stiffen and unite said members, and a rubber composition sole permanently connected to said sole connector member.

5. The stiffened rubber shoe sole comprising a plurality of heavy fabric stiffener members carrying and impregnated with cured phenolic condensation cementing material to stiffen, waterproof and unite said members, said stiffener members having a relatively thin attaching edge portion extending around the front portion of the shoe sole and a vulcanized rubber composition sole and attached heel portion engaging and penetrating the surface of one of said stiffener members and permanently vulcanized thereto.

6. The stiffened rubber shoe sole comprising a plurality of fabric stiffener members carrying cured phenolic condensation cementing material to stiffen and unite said members, said stiffener members having a relatively thin attaching edge portion extending around the front portion of the shoe sole and a vulcanized rubber composition sole engaging the surface of one of said stiffener members and permanently vulcanized thereto.

7. The stiffened rubber shoe sole comprising a plurality of fabric stiffener members carrying cured phenolic condensation cementing material to stiffen and unite said members and a vulcanized rubber composition sole permanently connected to said stiffener members.

8. The stiffened rubber shoe sole comprising a canvas fabric stiffener member impregnated with cured phenolic condensation cementing material to stiffen and waterproof said member, and a vulcanized rubber composition sole and attached heel portion permanently connected to said stiffener member and vulcanized thereto.

9. The stiffened rubber shoe sole comprising a fabric stiffener member impregnated with cured phenolic condensation cementing material and a vulcanized rubber composition sole permanently connected to said stiffener member and vulcanized thereto.

10. The stiffened rubber shoe sole comprising a fabric stiffener member carrying cured phenolic condensation cementing material and a rubber composition sole permanently connected to said stiffener member.

11. The stiffened rubber shoe sole comprising an incorporated canvas fabric stiffener member carrying cured phenolic condensation cementing material and having vulcanized rubber composition engaging and penetrating one surface of said stiffener member and permanently connecting it to the rubber element of the sole.

12. The stiffened rubber shoe sole comprising an incorporated fabric stiffener member carrying cured phenolic condensation cementing material and having vulcanized rubber composition engaging one surface of said stiffener member and connecting it to the sole.

13. The stiffened rubber shoe sole comprising an incorporated fabric stiffener member carrying cured phenolic condensation cementing material to stiffen and strengthen said member, said stiffener member having a relatively flexible attaching portion and a vulcanized rubber composition sole permanently connected to said stiffener member and vulcanized thereto.

14. The stiffened rubber shoe sole comprising an incorporated fabric stiffener member carrying cured phenolic condensation cementing material to stiffen and strengthen said member, and a vulcanized rubber composition sole permanently connected to said stiffener member.

15. The stiffened rubber shoe sole element comprising a permanently connected stiffener member carrying cured phenolic condensation cementing material.

HENRY C. EGERTON.